(12) United States Patent
Veltmans et al.

(10) Patent No.: US 6,841,016 B1
(45) Date of Patent: Jan. 11, 2005

(54) PROCESS FOR THE PRODUCTION OF CRYSTALLINE ENERGETIC MATERIALS

(75) Inventors: Wilhelmina Helena Maria Veltmans, Bergen op Zoom (NL); Franciscus Johannes Maria Wierckx, Bergen op Zoom (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 0 days.

(21) Appl. No.: 09/517,426

(22) Filed: Mar. 2, 2000

(51) Int. Cl.⁷ .............................................. D03D 23/00
(52) U.S. Cl. .................................................. 149/109.6
(58) Field of Search ..................................... 149/109.6

(56) References Cited

U.S. PATENT DOCUMENTS

| | | | |
|---|---|---|---|
| 3,222,231 A | * 12/1965 | Markels et al. ................ 149/2 |
| 3,671,515 A | * 6/1972 | Cox et al. .................... 149/100 |
| 3,954,526 A | * 5/1976 | Mangum et al. ................ 149/7 |
| 3,981,973 A | * 9/1976 | Richardson ................... 23/300 |
| 4,263,011 A | * 4/1981 | Huguenard et al. ........... 23/300 |
| 4,839,339 A | * 6/1989 | Bunker et al. ......... 252/182.12 |
| 5,020,731 A | * 6/1991 | Somoza et al. .......... 149/109.6 |
| 5,035,363 A | * 7/1991 | Somoza ................... 149/109.6 |
| 5,279,492 A | * 1/1994 | Somoza et al. .......... 149/109.6 |
| 5,449,424 A | * 9/1995 | Oliver et al. ............. 149/109.6 |
| 5,557,015 A | * 9/1996 | Zee et al. .................... 564/464 |
| 5,833,891 A | * 11/1998 | Subramaniam et al. ........ 264/7 |
| 5,874,574 A | * 2/1999 | Johnston et al. ............. 540/475 |
| 5,973,149 A | * 10/1999 | Bescond et al. ............. 544/345 |

* cited by examiner

*Primary Examiner*—Aileen B. Felton
(74) *Attorney, Agent, or Firm*—Fitch, Even, Tabin & Flannery

(57) ABSTRACT

The invention is directed to a process for the production of crystalline energetic materials having improved stability and/or decreased sensitivity by crystallization of the energetic materials with ultrasonic vibration having a frequency of between 10 and 100 kHz.

11 Claims, 7 Drawing Sheets

PROCESS FOR THE PRODUCTION OF CRYSTALLINE ENERGETIC MATERIALS

The invention is directed to a process for the production of crystalline energetic materials having improved stability and sensitivity properties.

Examples of energetic materials are energetic oxidisers and explosives. High energy oxidisers can be used as component in solid propellants for launchers and related applications. Examples of such oxidisers are hydrazinium nitroformate (HNF), nitramine hexaazaisowurtzitane (CL-20), ammonium dinitramide (ADN), ammonium-perchlorate (AP) and the like. Other materials falling in this class of energetic materials are explosives like cyclotrimethylene trinitramine (Hexogen, RDX), cyclotetramethylene tetranitramine (Octogen, HMX) and pentaerythrol tetranitrate (PETN).

These materials are all produced in a manner, wherein at some time during their preparation a crystallisation step occurs. Sometimes also a purifying recrystallisation step is included in the process. As the final product form of these materials is crystalline, one of the final steps of such a process includes a crystallisation.

For these crystalline energetic materials stability and sensitivity are very important parameters. Stability is of course important, as it determines the possible shelf life of the material during long term storage, and it further plays a role in the conditions under which the material can be stored and used (wider temperature range of storage and application conditions). More stable materials need less strict conditions for storage and use, or may be stored for a longer period of time under the same conditions.

The sensitivity, and more in particular the friction sensitivity and the impact sensitivity, are important, as it determines the care that should be taken during handling and transport of the material. Also sensitivity determines to a large extent the governmental restrictions posed on transport and storage.

It is accordingly one object of the present invention to improve the stability of crystalline energetic materials. It is another object of the invention to improve the sensitivity, such as impact and friction sensitivity thereof.

These and other objects are realised by the present invention, which comprises a process for the production of crystalline energetic materials having improved stability and/or decreased sensitivity by crystallisation of the energetic materials with ultrasonic vibration having a frequency of between 10 and 100 kHz. Preferably the amplitude of an ultrasonic probe used for producing the vibration is between 0.4 and 30 $\mu$m.

In another embodiment, a process for the production of crystalline energetic materials having improved stability and/or decreased sensitivity can comprise crystallizing the energetic materials with ultrasonic vibration having a frequency of between 10 and 100 kHz, while stirring the crystallizing mixture during crystallization.

The crystallizing mixture can be transported continuously through a zone of ultrasonic vibration.

The temperature during crystallization can be between 15 and 75° C.

Ultrasonic vibration can be generated using an ultrasonic probe, the amplitude thereof being between 0.4 and 30 $\mu$m.

Energetic materials can be selected from the group of explosives and high energy oxidizers. Energetic materials can be selected from the group consisting of hydrazinium nitroformate ("HNF"), CL-20, ADN, AP, RDX, HMX and PETN.

The present invention is based on the surprising discovery, that by carrying out the last crystallisation step in the presence of ultrasonic vibration with a frequency of between 10 and 100 kHz, the morphology, stability and sensitivity can be improved, i.e. the crystals become more rounded, the stability is better and the sensitivity is less.

In U.S. Pat. No. 3,222,231 published on Dec. 7, 1965, it is disclosed to improve the morphology of crystalline material, including ammonium perchlorate and hydrazinium nitroformate, by precipitating a solid solute out of solution, while mechanically agitating the solution and subjecting it to a high frequency vibration. According to this patent, the processing under vibration improves the morphology of the crystals. The disclosure of this patent does not indicate anything about the effect of the treatment on stability and sensitivity.

According to a more preferred embodiment the present invention is directed to an improvement in the production of hydrazinium nitroformate (HNF). HNF belongs to the class of high energy oxidisers and can be used in high performance chlorine free solid propellants.

HNF is generally produced in crystalline form by combining hydrazine and nitroform under well defined conditions, followed by further purification using i.a. crystallisation. One method for the production of HNF is described in U.S. Pat. No. 5,557,015. According to this method HNF is prepared in very pure form by reacting hydrazine and nitroform in a system that is a solvent for nitroform and a non-solvent for hydrazinium nitroformate, in the presence of a proton transferring medium.

The stability of the present energetic materials, and more in particular of HNF, can be determined by vacuum thermal stability (VTS) in accordance with STANAG 4479 at 60 and 80° C. for 48 to 100 hours.

The friction sensitivity is determined by BAM friction in accordance with ONU 3$b$)i), the impact sensitivity by BAM impact in accordance with ONU 3$a$)ii).

It has been noted that whereas the HNF crystals are having an aspect ratio of more than 4 after crystallisation without ultrasonic vibration, the crystals produced in accordance with the process of the present invention have an aspect ratio, which is sometimes lower than this, depending both on the applied amplitude of the ultrasonic probe and the recrystallisation method used. However, it has also been found that there is no direct link between the aspect ratio of the crystals on the one hand and the stability or sensitivity on the other hand.

The process of the present invention can be carried out in various ways. In general it is important that during crystallisation the crystallising mixture is subjected to treatment with the ultrasonic vibration. This process can be applied during crystallisation and during recrystallisation.

In case of batch processing one may subject the whole batch at the same time to an ultrasonic vibration. In the alternative it can be done by stirring the crystallising mixture in such a way that the batch content moves through a region of ultrasonic vibration sufficiently frequently to obtain the effect. This can for example be done by using an ultrasonic probe, whereby the stirring regime or the construction of the crystalliser is such that the suspension passes the vibration zone frequently. It is also possible to include the treatment in a recirculation loop of the crystalliser.

The temperature of the treatment is not critical, although it may have some effect on the actual stability, sensitivity and morphology. Temperatures between 0 and 100° C., preferably between 15 and 75° C. can be used.

The present invention is now explained on the basis of the production of crystalline HNF, although it will be clear to the skilled person that other materials may be produced using the same principles, wherein variation may be applied, if necessary to take into account the actual production methods of other materials, while maintaining the basic principles of the invention.

In the operation of the present invention first HNF is prepared from hydrazine and nitroform, for example as disclosed in the cited U.S. Pat. No. 5,557,015, The contents of which is incorporated herein by way of reference. In general this means that nitroform having a purity of more than 98.5%, dissolved in dichloroethane, and water (6 vol. %) are mixed. At 0° C. an equimolar amount of hydrazine, purity 99.5%, is added and the mixture is stirred, while keeping the temperature between 0 and 5° C. The crystalline HNF obtained thereby is then subjected, either in the reaction mixture, or after crystallisation and/or additional purification, to a final (re)crystallisation in the presence of the ultrasonic vibration.

The invention is now further explained on the basis of a number of examples.

EXAMPLE 1

(Ultrasound (US) Applied During Cooling-Crystallisation of HNF)

Nitroform, dissolved in dichloroethane (23 wt. % nitroform), and water (6 vol. %) are mixed. At 0° C. an equimolar amount of hydrazine, purity 99.5%, is added and the mixture is stirred, while keeping the temperature between 0 and 5° C. The crystalline HNF obtained thereby is separated from the mother liquor and redissolved in methanol.

The HNF solution in methanol is subsequently cooled yielding HNF crystals. This experiment has been performed in the absence of ultrasound (US) (reference, amplitude 0 $\mu$m) and under ultrasonic vibration with a frequency of 20 kHz and varying ultrasone amplitude. FIGS. 1, 2, 3 and 4 show the properties of HNF crystals obtained in several experiments in which the amplitude of ultrasonic vibration is varied during cooling crystallisation.

Figure 1:
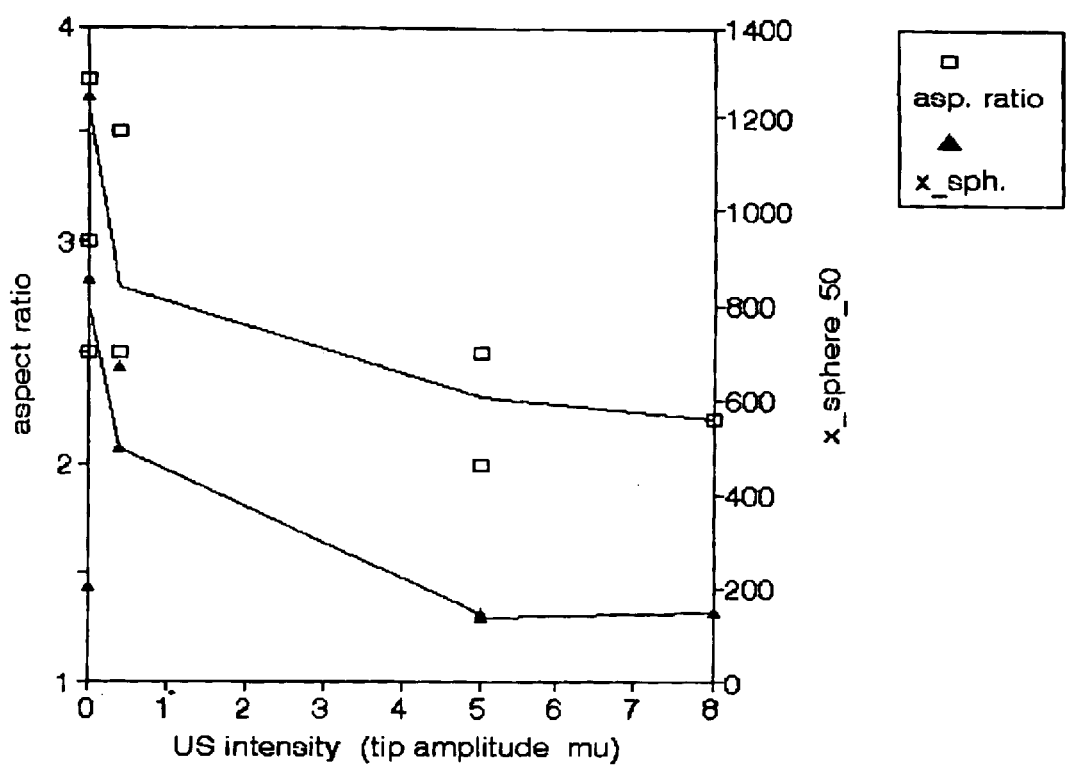
FIG. 1 shows the positive effect of ultrasound (US) on the morphology of HNF, expressed as the Length over Diameter (L/D) and average particle size ($X_{sph.}$).
Figure 2:
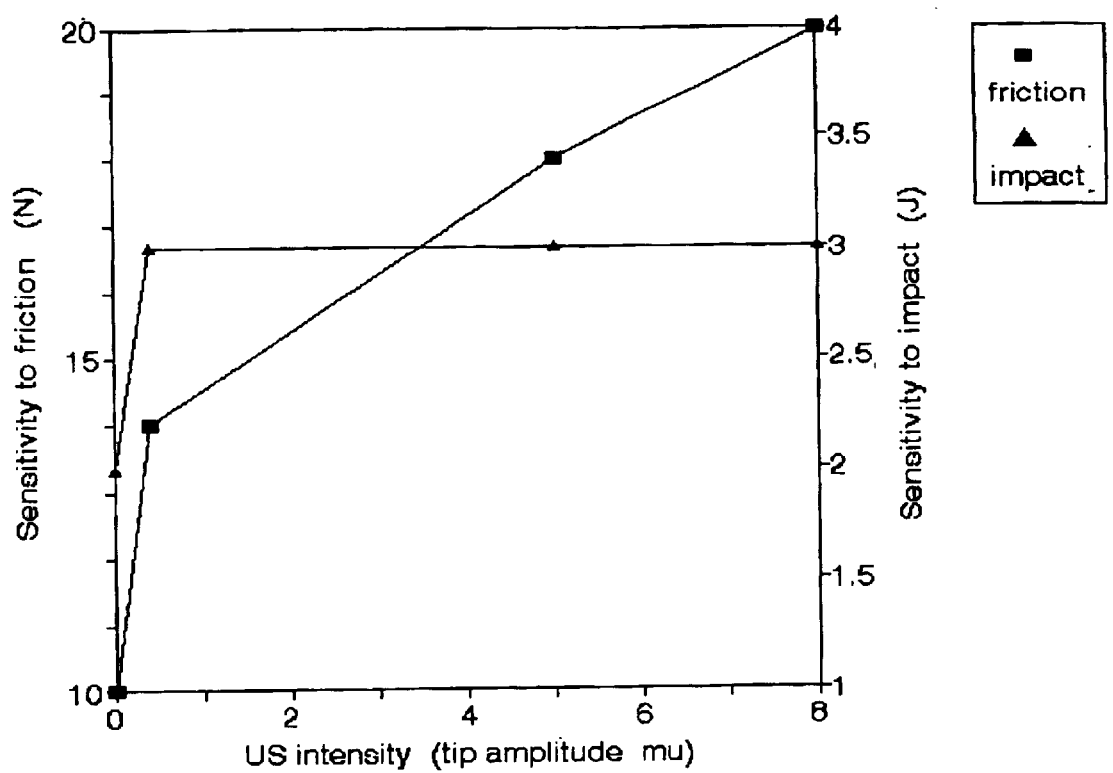
FIG. 2 shows the positive effect of ultrasound (US) on the sensitivity of HNF, expressed in BAM impact and BAM friction values ([N] and [N.m] respectively).
Figure 3:
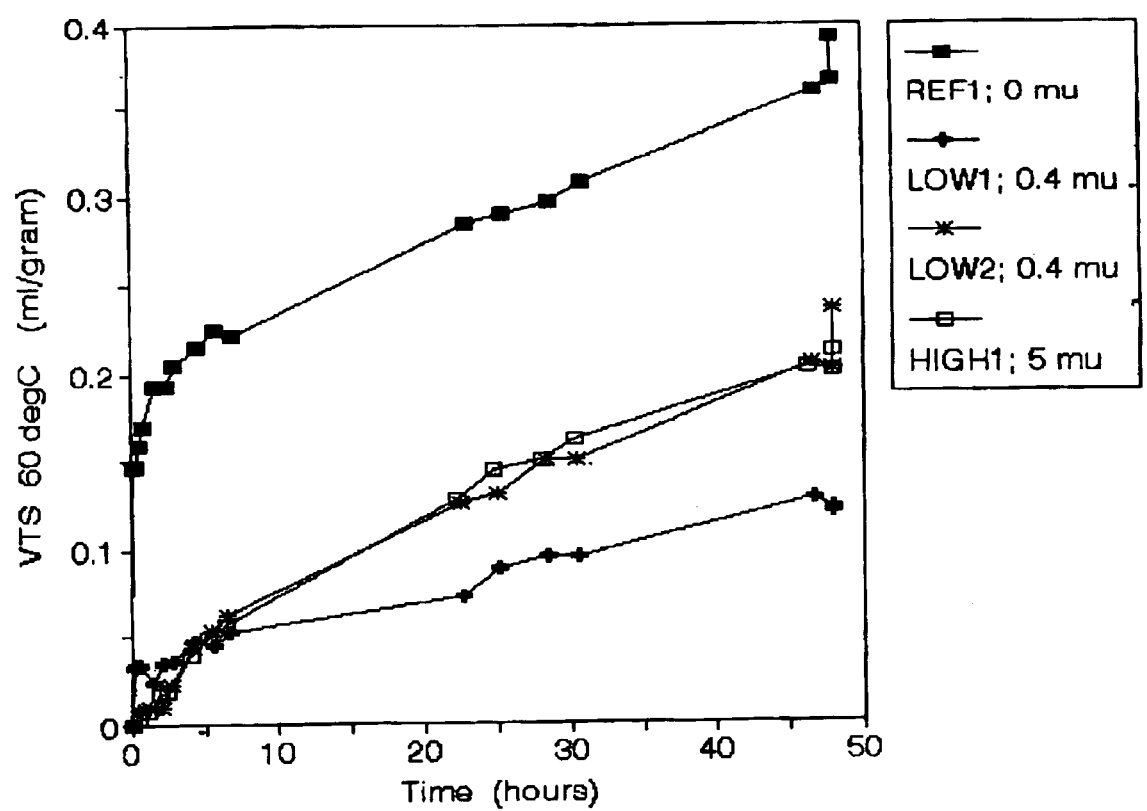
FIG. 3 shows that ultrasound (US) has a positive effect on the thermal stability of HNF at 60° C. The initial gas evolution decreases in comparison to the reference sample (no ultrasound (US)=amplitude of 0 $\mu$m) and the gas evolution in time decreases as well when a low amplitude of 0.4 $\mu$m is applied.
Figure 4:
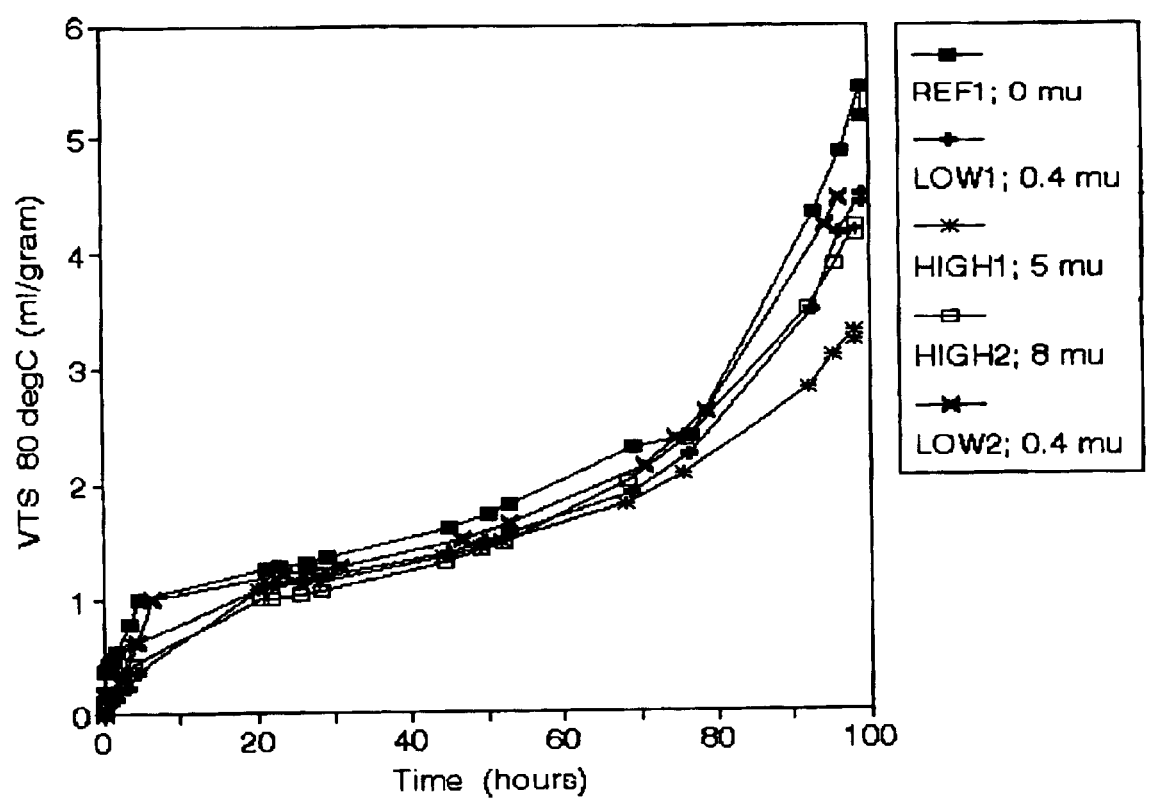

FIG. 4 gives an indication of the positive effect of ultrasound (US) on thermal stability at 80° C. At 80° C. the effect becomes more apparent (on the larger gas evolution scale) after –80 hrs. These four figures clearly show the positive effect of ultrasound (US) during cooling crystallisation on morphology, sensitivity and stability in comparison to the reference HNF crystallised in absence of ultrasound (US).

EXAMPLE 2

(Ultrasound (US) Applied During Drowning Out Crystallisation of HNF)

Figure 5:
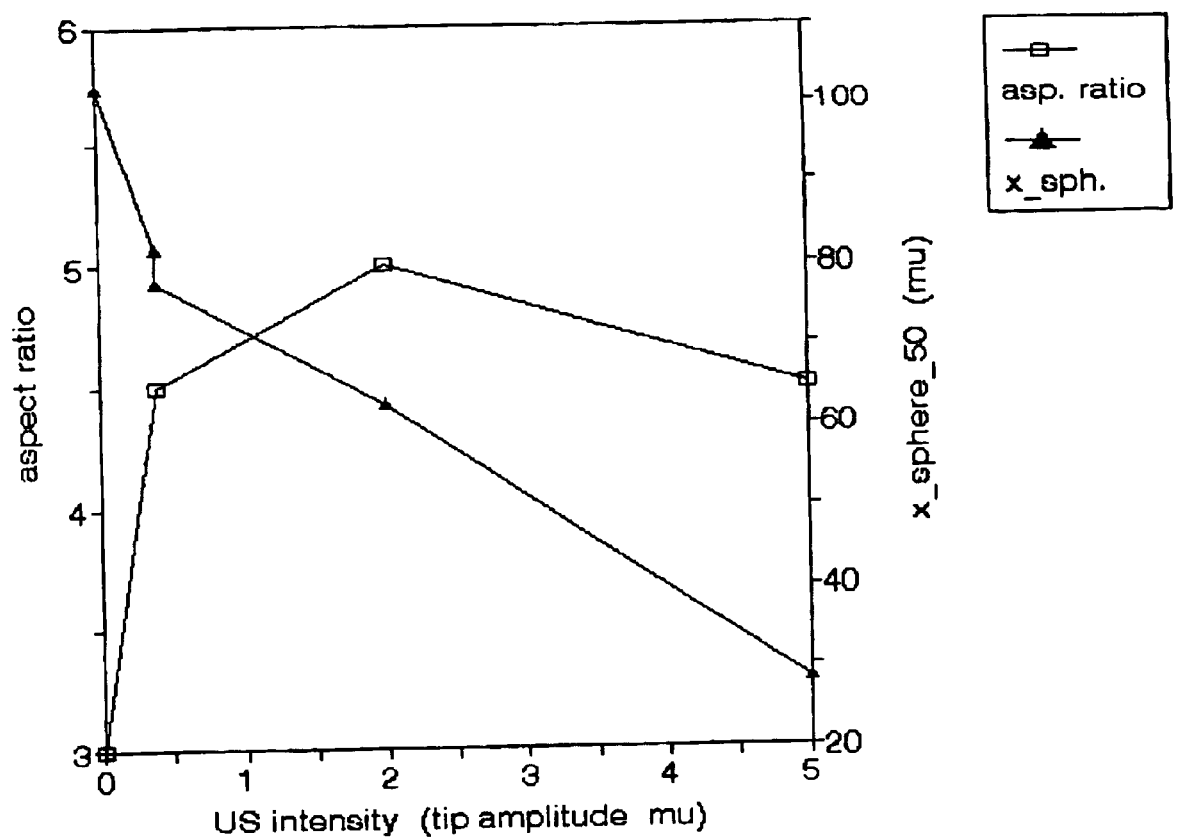
Figure 6:
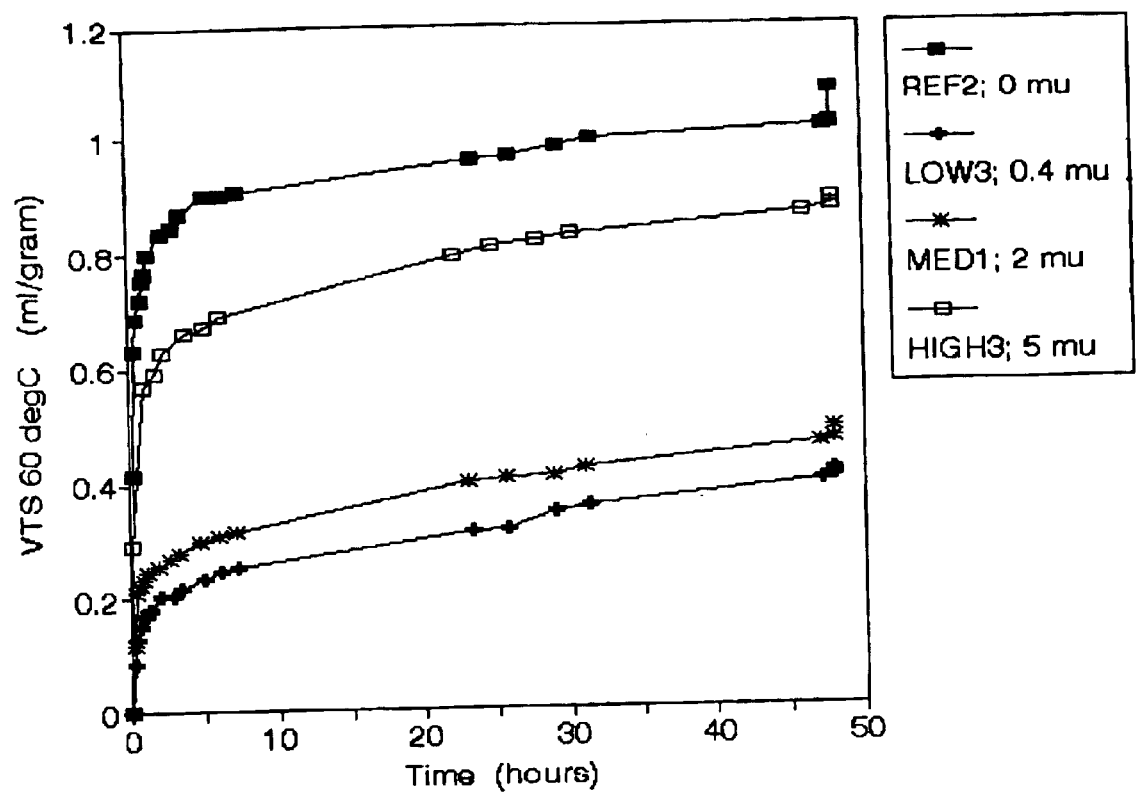
Figure 7:
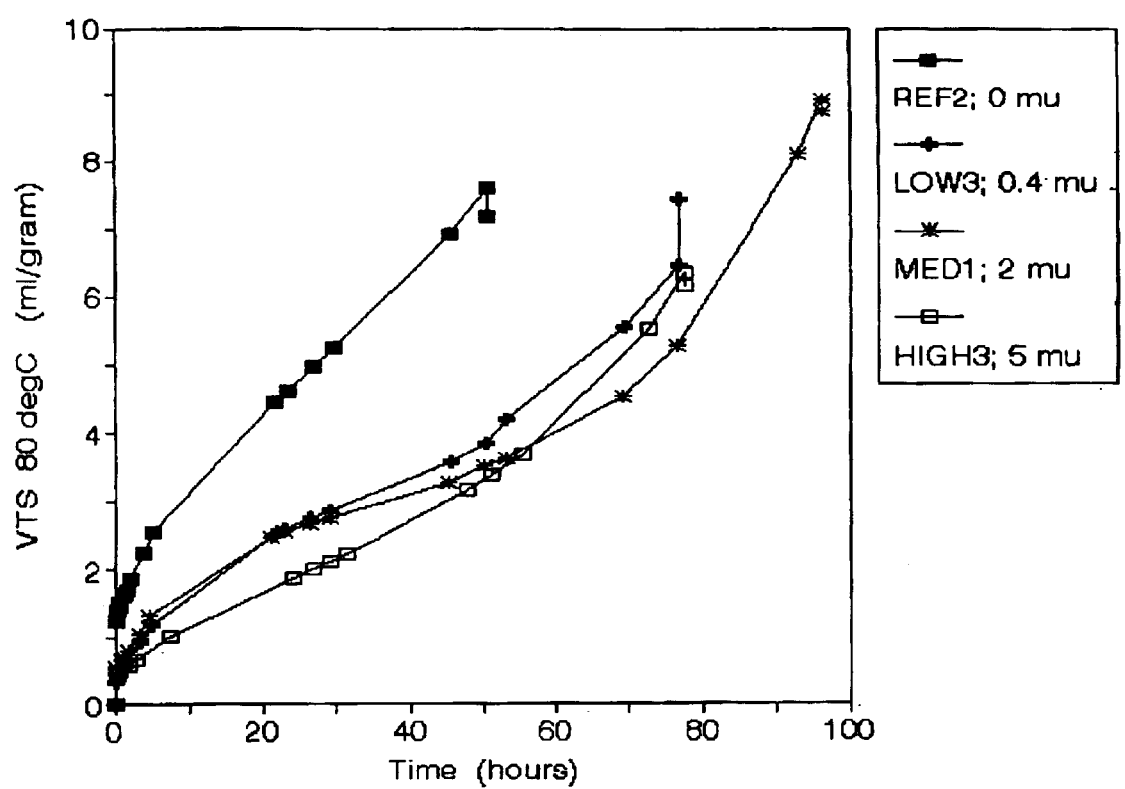

HNF is prepared by the method described in example 1. The HNF in methanol solution is subsequently closed in a methylene chloride/methanol solution yielding HNF crystals. This experiment has been performed in the absence of ultrasound (US) (reference, amplitude 0 $\mu$m) and under ultrasonic vibration with a frequency of 20 kHz and varying ultrasone amplitude. FIGS. 5, 6 and 7 show the properties of HNF crystals obtained in several experiments in which the amplitude of ultrasonic vibration is varied during drowning out crystallisation.

FIG. 5 shows the negative effect of ultrasound (US) on morphology; L/D increases which implies that the HNF crystals are more needle shaped.

FIGS. 6 and 7 show VTS results at 60 and 80° C., respectively.

From FIG. 6 it can be clearly seen that ultrasound (US) application reduces initial gas evolution with a minimum initial gas evolution at a low to medium ultrasound (US) amplitude (0.4–2 $\mu$m).

FIG. 7 shows that at higher temperature (80° C.) the application of ultrasound (US) not only reduces the initial gas evolution but also the overall gas evolution rate in time. These three figures clearly show that in spite of the negative influence of ultrasound (US) during drowning-out crystallisation on morphology, ultrasound (US) has a positive influence on stability in comparison to the reference HNF crystallised in absence of ultrasound (US).

What is claimed is:

1. A process for producing crystalline energetic materials, comprising:

preparing a crystallizing mixture comprising a solvent and a crystallizable energetic material selected from the group consisting hydrazinium nitroformate, CL-20, ADN, AP, RDX, HMX and PETN;

subjecting the crystallizing mixture to ultrasonic vibration having a frequency of between 10 and 100 kHz using an ultrasonic probe having an amplitude of between 0.4 and 30 $\mu$m; and harvesting a crystalline energetic material after crystallization, wherein said crystalline energetic material has improved stability and decreased sensitivity compared to crystalline energetic material crystallized in the absence of said ultrasonic vibration.

2. The process of claim 1, wherein said process is carried out at a temperature between 0° C. and 100° C.

3. The process of claim 2, wherein said process is carried out at a temperature between 15° C. and 75° C.

4. A process for producing crystalline hydrazinium nitroformate, comprising:

(a) preparing a crystallizing mixture comprising a solvent and hydrazinium nitroformate;

(b) subjecting the crystallizing mixture to ultrasonic vibration having a frequency of between 10 and 100 kHz using an ultrasonic probe having an amplitude of between 0.4 and 30 $\mu$m; and (c) harvesting crystalline hydrazinium nitroformate after crystallization, wherein said crystalline hydrazinium nitroformate has improved stability and decreased sensitivity compared to crystalline hydrazinium nitroformate crystallized in the absence of said ultrasonic vibration.

5. The process of claim 4, wherein said process is carried out at a tempera between 0° C. and 100° C.

6. The process of claim 5, wherein said process is carried out at a temperature between 15° C. and 75° C.

7. The process of claim 1, wherein said crystallizable energetic material is selected from the group consisting of CL-20, ADN, RDX, HMX and PETN.

8. The process of claim 1, wherein said crystallizable energetic material is CL-20.

9. The process of claim 1, wherein said crystallizable energetic material is ADN.

10. The process of claim 1, wherein said crystallizable energetic material is selected from the group consisting of RDX and HMX.

11. The process of claim 4, wherein said process further comprises (a1) preparing hydrazinium nitroformate in a reaction medium and obtaining crystals of said hydrazinium nitroformate therefrom in the absence of ultrasonic vibration; and wherein in (a) said crystals of hydrazinium nitroformate from (a1) are used in preparing said crystallizing mixture comprised of solvent and hydrazinium nitroformate.

\* \* \* \* \*